United States Patent
Pfahnl

(10) Patent No.: US 10,197,132 B2
(45) Date of Patent: Feb. 5, 2019

(54) ROPE TENSIONING AND FASTENING DEVICE

(71) Applicant: John Charles Pfahnl, San Jose, CA (US)

(72) Inventor: John Charles Pfahnl, San Jose, CA (US)

( * ) Notice: Subject to any disclaimer, the term of this patent is extended or adjusted under 35 U.S.C. 154(b) by 0 days.

(21) Appl. No.: 15/799,703

(22) Filed: Oct. 31, 2017

(65) Prior Publication Data
US 2018/0119775 A1    May 3, 2018

Related U.S. Application Data

(60) Provisional application No. 62/415,285, filed on Oct. 31, 2016.

(51) Int. Cl.
*F16G 11/04* (2006.01)
*F16G 11/10* (2006.01)

(52) U.S. Cl.
CPC ......... *F16G 11/106* (2013.01); *Y10T 24/3918* (2015.01)

(58) Field of Classification Search
CPC ............. Y10T 24/3916; Y10T 24/3918; Y10T 24/3724; Y10T 24/39
See application file for complete search history.

(56) References Cited

U.S. PATENT DOCUMENTS 686,477 A * 11/1901 Priddat .................. B65D 63/14
                                                 24/130
736,628 A * 8/1903 Priddat .................. B65D 63/14
                                                 24/130
760,428 A * 5/1904 Cross ..................... F16G 11/10
                                                 24/130

(Continued)

FOREIGN PATENT DOCUMENTS

| AU | 198054872 | 1/1980 |
| GB | 2510856 A | 8/2014 |

OTHER PUBLICATIONS

DFHGate.com: 2015 10pcs Quick Knot Tent Wind Rope Buckle. URL: http://www.dhgate.com/product/201510pcsquickknot-tentwindropebuckle/254028822.html. Date Accessed: Feb. 10, 2017.

*Primary Examiner* — Robert Sandy
*Assistant Examiner* — Michael S Lee
(74) *Attorney, Agent, or Firm* — Brian Beverly; Beeson Skinner Beverly, LLP

(57) ABSTRACT

The rope tightening and fastening device of the invention is a flat, elongated device having at one end a forward-opening, V-shaped mouth including opposing surfaces and at the other end a rear-facing back edge with a knob extending rearward therefrom. Rear and cinching apertures are disposed between the mouth and knob, the rear aperture having a forward-facing engagement surface and the cinching aperture having a rear-facing engagement surface, the forward-facing engagement surface configured to engage the beginning of one leg of a rear loop of rope that is passed through the rear aperture and fastened around the knob, the rear-facing engagement surface configured to engage the end of a return leg of a forward loop of rope extending from the rear aperture, and the opposing surfaces of the mouth having gripping members for securing a portion of rope under tension in the mouth.

14 Claims, 5 Drawing Sheets

(56) References Cited

U.S. PATENT DOCUMENTS

| | | | | |
|---|---|---|---|---|
| 904,747 A * | 11/1908 | Anderson | ............... | F16G 11/10 |
| | | | | 24/130 |
| 1,205,496 A | 11/1916 | Whitehead | | |
| 1,426,537 A | 8/1922 | Bauer | | |
| 2,151,664 A | 4/1938 | Redfield | | |
| 2,271,288 A * | 1/1942 | Cuff | ..................... | D06F 53/00 |
| | | | | 24/130 |
| 2,536,159 A * | 1/1951 | Darkins | ................ | D06F 53/00 |
| | | | | 24/130 |
| 3,711,901 A | 1/1973 | Close | | |
| 4,281,439 A | 8/1981 | Klein | | |
| 4,355,444 A * | 10/1982 | Haney | ................. | F16G 11/143 |
| | | | | 24/129 B |
| D289,373 S | 4/1987 | Kimball | | |
| 4,939,820 A | 7/1990 | Babcock | | |
| 5,205,687 A | 4/1993 | Boyland | | |
| 5,220,709 A | 6/1993 | Boyland | | |
| 5,224,246 A | 7/1993 | Royball | | |
| 5,339,498 A | 8/1994 | Parsons | | |
| 5,625,925 A | 5/1997 | Richards | | |
| 7,143,708 B1 * | 12/2006 | Cimino | ................ | B63B 59/02 |
| | | | | 114/219 |
| 8,001,659 B2 | 8/2011 | Sorensen | | |
| 8,661,624 B1 | 3/2014 | Bracewell | | |
| 2008/0110000 A1 | 5/2008 | Orr | | |
| 2013/0193355 A1 * | 8/2013 | Nelson | ................ | A63H 27/10 |
| | | | | 251/7 |
| 2014/0196256 A1 * | 7/2014 | Garcia | ................ | F16G 11/046 |
| | | | | 24/129 R |

* cited by examiner

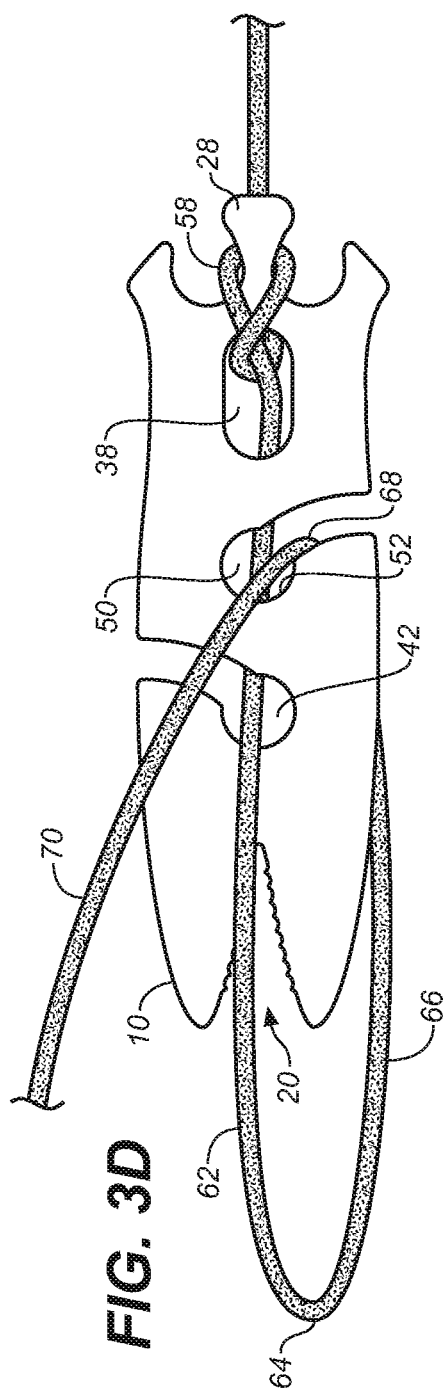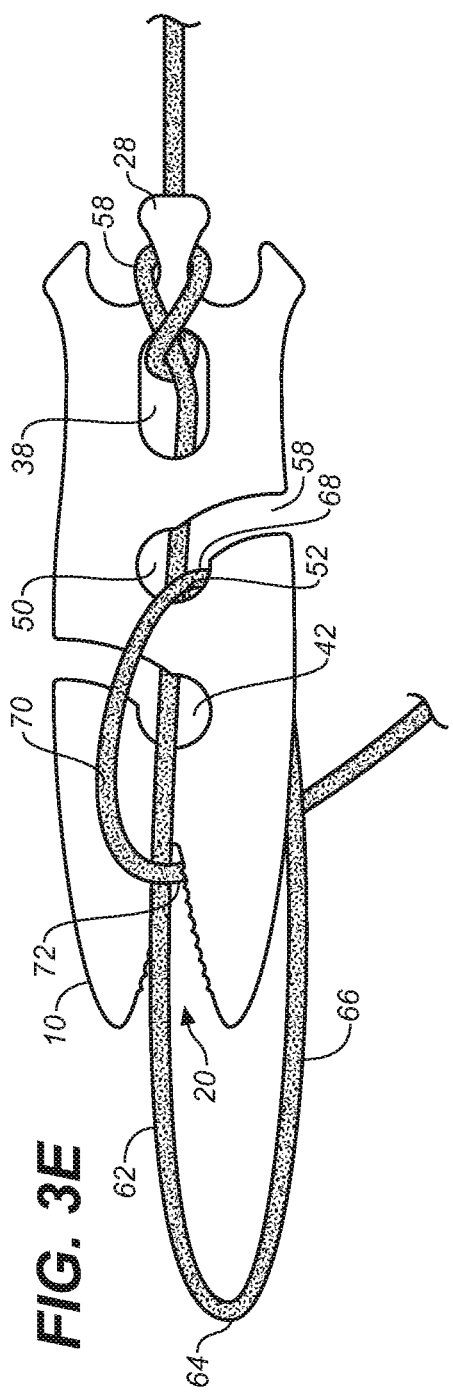

ROPE TENSIONING AND FASTENING DEVICE

CROSS-REFERENCE TO RELATED APPLICATIONS

This application claims the benefit of U.S. Provisional Application No. 62/415,285 filed Oct. 31, 2016.

BACKGROUND OF INVENTION

Field of Invention

This invention relates to devices for tensioning or fastening ropes and to an improved device for tensioning and fastening a rope between two objects without the need to tie complex knots as when used, for example, with tent fastening ropes and tying tackles.

Discussion of Prior Art

Ropes and lines are often used to secure one item to another, such as a tent or tarp to a stake or anchor point. It can be difficult to tighten a rope when tying the rope to a tie-down point. Therefore, it would be useful to have a device that makes it easier to apply adequate tension to and securely fasten a rope. There are many known rope tensioning devices currently available. However, existing devices have drawbacks, such as having complicated parts, being difficult to use, or requiring that complex knots be tied.

SUMMARY OF INVENTION

The present invention is directed to an improved rope tensioning and fastening device that allows for a rope to be conveniently fastened between two objects.

The device is a substantially flat, elongated device made of any material, including plastic or wood, that is suitably strong and rigid. The front end of the device has a forward-opening, V-shaped mouth including opposing surfaces, and the back end has a rear-facing back edge with a knob extending rearward therefrom. One or more apertures are located between the mouth and the knob in order to form a forward-facing engagement surface and a rear-facing engagement surface. The forward-facing engagement surface is configured to engage the beginning of one leg of a rear loop of rope that is passed through one of the one or more apertures and looped securely around the knob. The rear-facing engagement surface is configured to engage the end of a return leg of a forward loop of rope extending from one of the one or more apertures. The opposing surfaces of the mouth each have a plurality of gripping members formed thereon for securing a portion of rope in the mouth when the rope is under tension.

The rope tensioning and fastening device of the invention has a marked advantage over prior art devices as it minimizes the total number of turns a rope must make before being finally cinched in the mouth of the device. In addition, the plate-like body and linear configuration of the device allow for the device to be more efficiently produced and gives the device a clean visual aesthetic.

BRIEF DESCRIPTION OF THE DRAWINGS

FIGS. 3A to 3E illustrate a method of using the rope tensioning and fastening device of the invention.

DETAILED DESCRIPTION OF THE ILLUSTRATED EMBODIMENT

Figure 1:
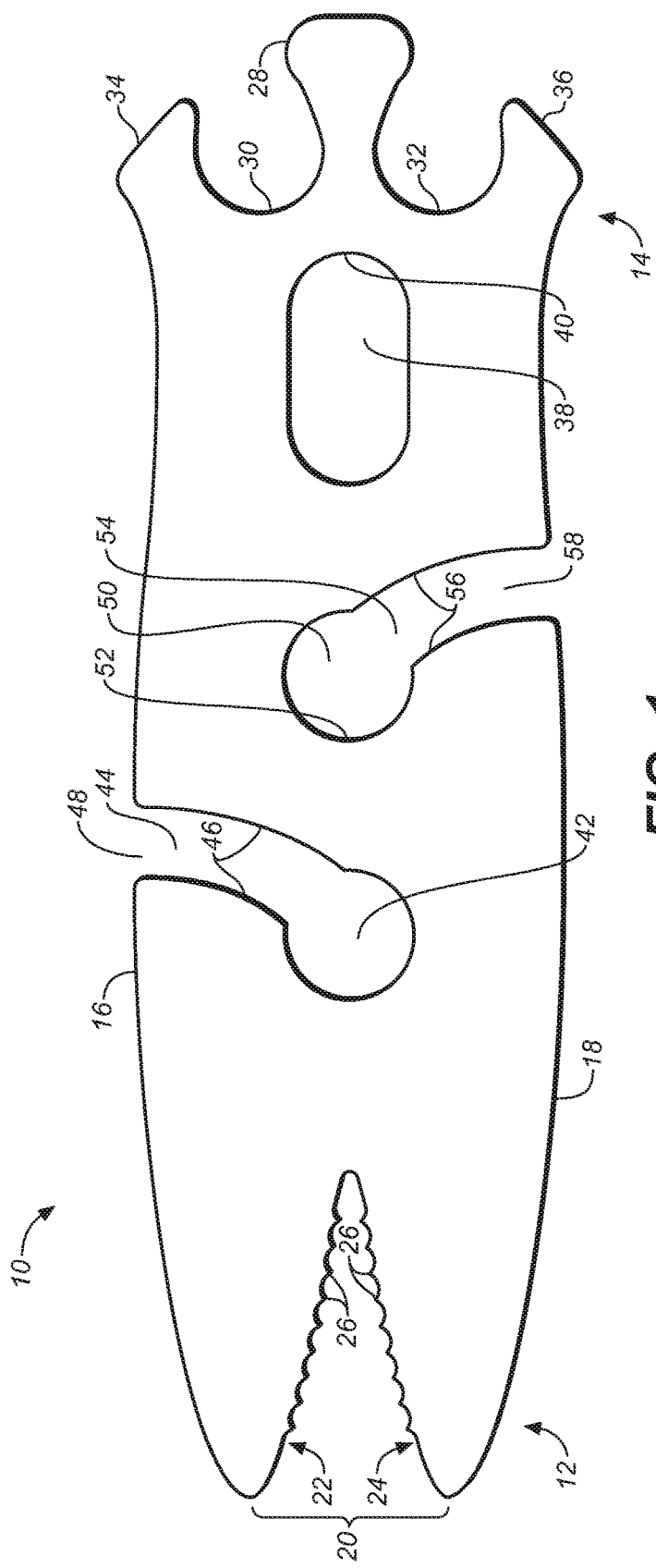
FIG. 1 is a right-side, elevation view of the rope tensioning and fastening device of the invention.
Figure 2:
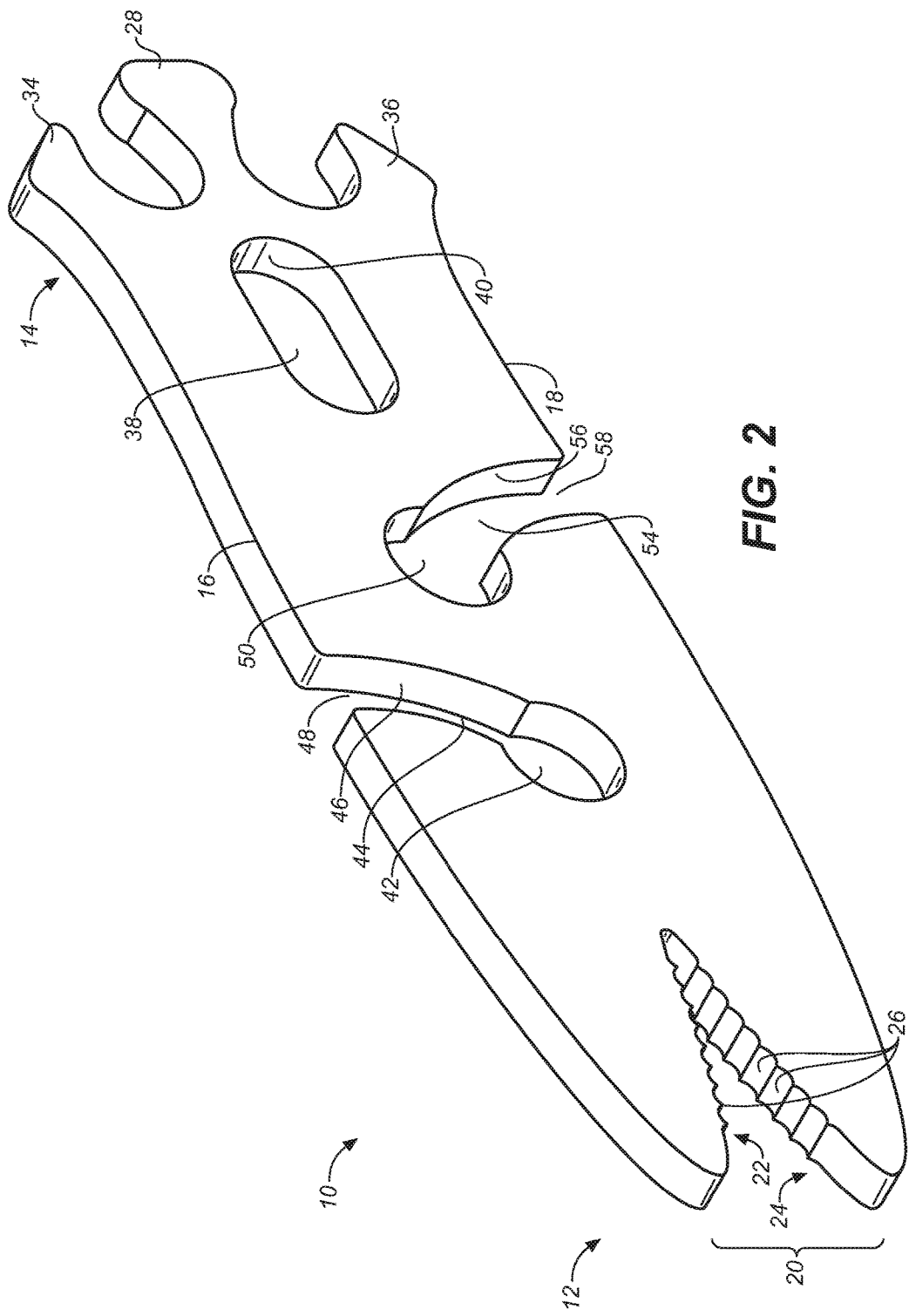
FIG. 2 is a front, upper-right perspective view thereof.

An improved rope tensioning and fastening device, now described with respect to the drawings, is referred to generally at numeral 10. The device is substantially flat and constructed of any material suitable to withstand the stresses acting on it, including plastic or wood, and having a front end 12, a back end 14, and top edge 16 and a bottom edge 18. A forward-facing, V-shaped mouth 20 on the front end 12 has two opposing surfaces 22, 24, each of which includes a plurality of gripping members 26. The gripping members 26 may be any suitable structure for securing a portion of rope between the opposing surfaces 22, 24, such as teeth or barbs. At the back end 14 a knob 28 extends rearwardly from a pair of rearwardly-facing capture surfaces 30, 32. As discussed in greater detail below, the rear-facing capture surfaces 30, 32 are for capturing the legs of a loop of rope that is wrapped around the knob 28. As seen in the illustrated embodiment, top and bottom protuberances 34, 36 extend rearwardly on opposite sides of capture surfaces 30, 32.

A rear aperture 38 is disposed near the knob 28 and capture surfaces 30, 32, one end of which forms a forward-facing engagement surface 40. As described in detail below with respect to FIGS. 3A to 3E, the forward-facing engagement surface 40 is configured to work in cooperation with knob 28 and capture surfaces 30, 32 to engage the beginning of one leg of a rear loop of a rope that is passed through the rear aperture 38 and wrapped around the knob 28. In the illustrated embodiment, the rear aperture 38 has a closed, oblong shape with a concave, semi-circular forward-facing engagement surface 40. However, within the scope of the invention, the rear aperture 38 can be any shape, open or closed, that is sized for receiving a loop of rope and that forms a forward-facing surface suitable for engaging the leg of the loop of rope as mentioned above.

An alignment aperture 42, disposed between knob 28 and mouth 20, is configured to receive an initial leg of a forward loop of a rope extending from the rear aperture as seen in FIGS. 3A-3E. In the illustrated embodiment, the alignment aperture 42 includes a channel 44 having curving channel edges 46 and an opening 48 at the top edge 16 of the device. The channel 44 facilitates insertion of a portion of rope into the alignment aperture 42. However, in alternate embodiments, the alignment aperture 42 may have another shape or configuration, may be open or closed, need not include the channel 44, and the channel opening 48 may be disposed at the bottom edge 18.

A cinching aperture 50, disposed between alignment aperture 42 and rear aperture 38, forms a rear-facing engagement surface 52 that is configured to engage the end of a return leg of a forward loop of a rope extending from the rear aperture to and around a stationary object. In the illustrated embodiment, the cinching aperture 50 is disposed between the alignment aperture 42 and the rear aperture 38, but in alternate embodiments, the cinching aperture 50 is located between the mouth 20 and the alignment aperture 42. The cinching aperture 50, similar to the alignment aperture 42, has an open configuration including a channel 54 having forward-curving channel edges 56 and an opening 58 at the bottom edge 18 of the device. In alternate embodiments of the invention, the cinching aperture 50 may have another shape or configuration, may be open or closed, need not include the channel 54, and the channel opening 58 may be disposed at the top edge 16.

In the illustrated embodiment, the mouth 20, the knob 28, and the forward- and rear-facing engagement surfaces 40, 52 are configured in a linear arrangement so that when a rope is tightened using the device as described below, the longitudinal dimension of the device will be brought into linear alignment with the rope.

Figure 3A:
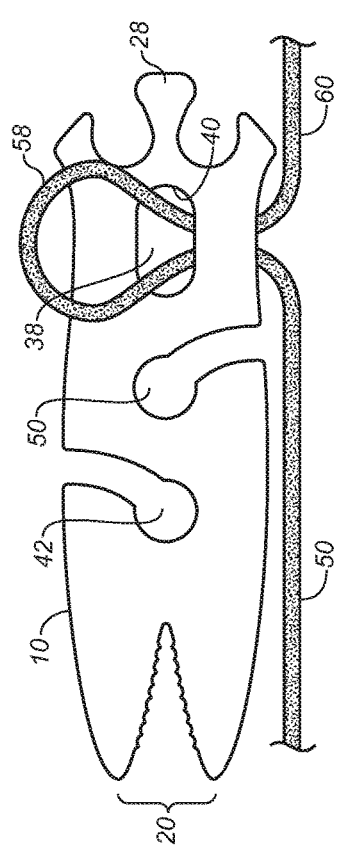
Figure 3B:
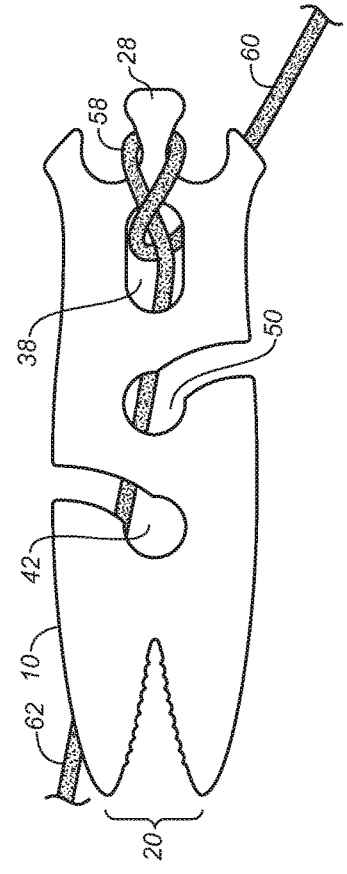
Figure 3C:
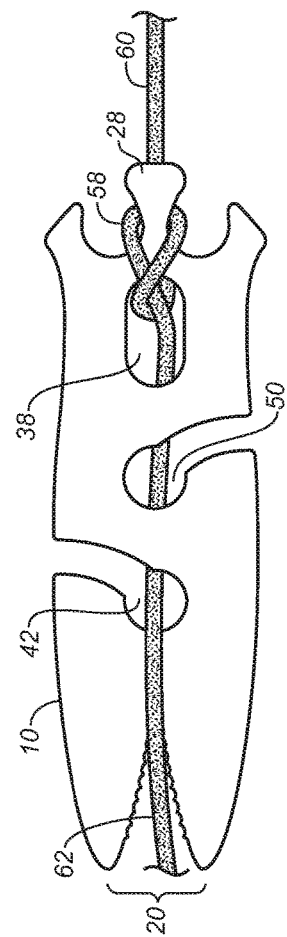

Use of the device 10 is now described with reference to FIGS. 3A to 3E. In FIG. 3A, a rear loop 58 of a rope 60 is received through the rear aperture 38. In FIG. 3B, the rear loop 58 is shown looped around the knob 28. In FIG. 3C, as a forward pulling force is applied to the rope 50, the forward-facing engagement surface 40 of the rear aperture 38 engages the beginning of one leg 60 of the rear loop 58 that has been fastened to a nearby object, and a first leg 62 of a forward loop 64 (shown in FIGS. 3D and 3E) of rope 60 is received through the alignment aperture 42, thus urging the device 10 into linear alignment with the rope 60.

In FIG. 3D, it is seen that forward loop 64 is formed from a first leg 62 and a second leg 66. The forward loop 64 is generally passed around an object or anchor point (not shown) with the second leg 66 returning to device 10. The rope 60 is then passed through the open channel 58 of the cinching aperture 50, and a forward pulling force is again applied to the rope 60 such that the rear-facing engagement surface 52 of the cinching aperture 50 engages the end of the second leg 66 of the forward loop 64 at a first bend 68 and beginning a third leg 70 of the rope 50.

In FIG. 3E, the rope 50 is fed through mouth 12 where it is cinched at second bend 72 on gripping members 26. The rope 60 can easily be adjusted by disengaging it from mouth 12, pulling or releasing third leg 70 as desired, and re-engaging the rope in the mouth.

Figure 4:
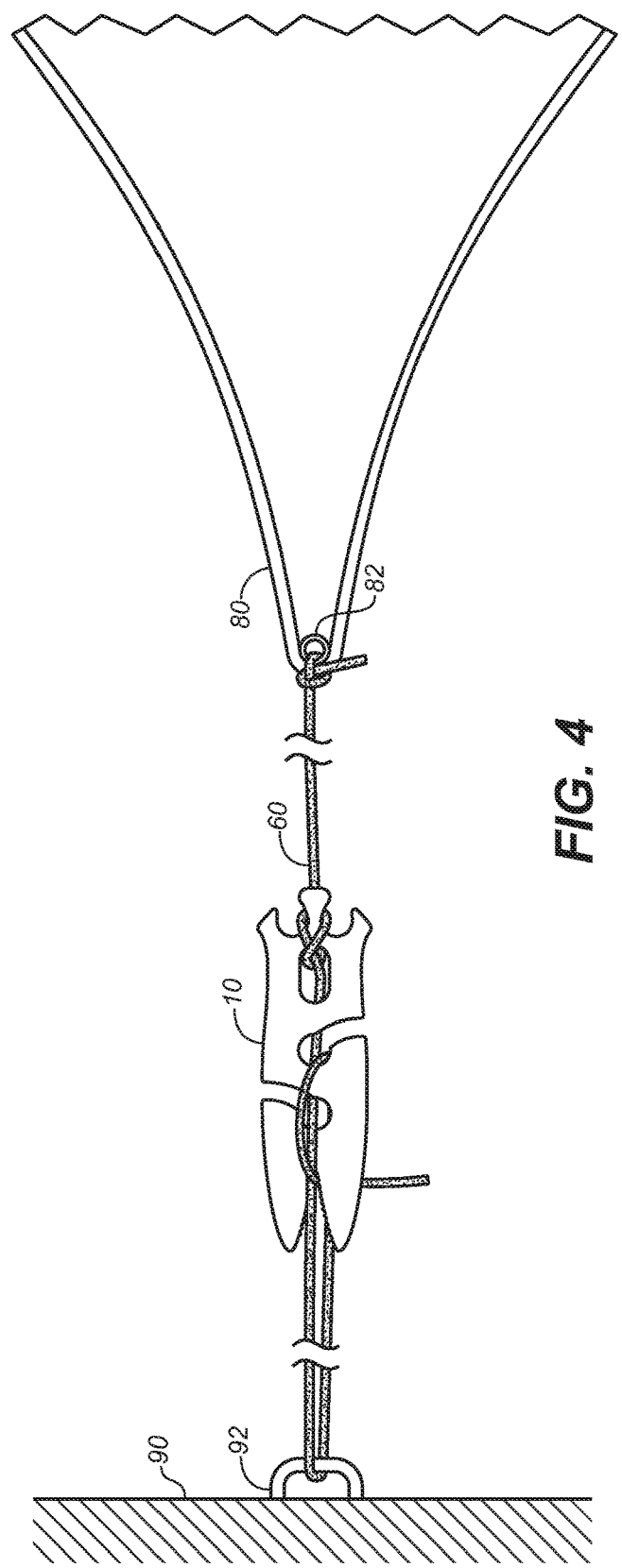
FIG. 4 is an illustration of the rope tensioning and fastening device of the invention being used to tightly secure a rope between a tarp and an anchor.

FIG. 4 shows the device 10 as it is being used to tighten and fasten a rope between two objects. In the illustrated example, the rope 60 is initially tied to a tarp 80 at ring 82, after which the device 10 is used to loop the rope 60 around a ring 92 of an anchor 90, and then to tighten and fasten the rope 50 between the tarp 80 and the anchor 90. Once secured, the device 10 and the rope 50 are aligned in clean, linear form.

There have thus been described and illustrated certain embodiments of an improved rope tensioning and fastening device. It should be clearly understood that the disclosure is illustrative only and is not to be taken as limiting, the spirit and scope of the invention being limited only by the terms of the appended claims and their legal equivalents.

What I claim is:

1. A rope tensioning and fastening device comprising:
  a substantially flat body extending lengthwise from a front end to a back end and widthwise from a top edge to a bottom edge,
  the front end having a forward-opening V-shaped mouth including opposing surfaces, each opposing surface having a plurality of gripping members formed thereon, the gripping members configured to engage a portion of rope disposed between the opposing surfaces for securing the rope in the mouth when the rope is brought under tension,
  the back end having a rear-facing back edge including a first protuberance near the top edge, a second protuberance near the bottom edge, a knob disposed between the first and second protuberances and rear-facing capture edges formed between the knob and each protuberance, the rear-facing capture edges configured to capture the first and second legs of a rear loop of a rope that is looped securely around the knob, and
  one or more apertures disposed between the mouth and the rear-facing back edge, one of the one or more apertures having a forward-facing engagement surface and one of the one or more apertures having a rear-facing engagement surface, the forward-facing engagement surface configured to engage the beginning of one leg of a rear loop of a rope that is passed through one of the one or more apertures and looped around the knob, and the rear-facing engagement surface configured to engage the end of a return leg of a forward loop of a rope received in one of the one or more apertures.

2. The rope tensioning and fastening device of claim 1, wherein:
  the one or more apertures include a rear aperture that forms the forward-facing engagement surface, and a cinching aperture that forms the rear-facing engagement surface.

3. The rope tensioning and fastening device of claim 2, wherein:
  the cinching aperture includes a channel originating at an opening at one of the top and bottom edges and terminating at the rear-facing engagement surface, the rear-facing engagement surface disposed midway between the top and bottom edges.

4. The rope tensioning and fastening device of claim 2, wherein:
  the at least one aperture includes an alignment aperture configured to receive an initial leg of a forward loop of a rope extending from the rear aperture.

5. The rope tensioning and fastening device of claim 4, wherein:
  the alignment aperture includes a channel originating at an opening at one of the top and bottom edges and terminates midway between the top and bottom edges.

6. The rope tensioning and fastening device of claim wherein:
  the rear aperture is disposed between the knob and the cinching aperture, the cinching aperture is disposed between the rear and alignment apertures, and the alignment aperture is disposed between the cinching aperture and the mouth.

7. The rope tensioning and fastening device of claim 5, wherein:
  the mouth, the knob, the forward-facing engagement surface, the rear-facing engagement surface and the alignment aperture are configured to be in a linear arrangement.

8. The rope tensioning and fastening device of claim 7, wherein:
  the channels of the alignment and cinching apertures each comprise forward-curving channel edges.

9. The rope tensioning and fastening device of claim 1, wherein:
  the mouth, the forward-facing engagement surface, and rear-facing engagement surface and the knob are configured in a linear arrangement.

10. A rope tensioning and fastening device comprising:
  a substantially flat, elongated body extending lengthwise from a front end to a back end and widthwise from a top edge to a bottom edge,
  the front end having a forward-opening V-shaped mouth including opposing surfaces,
  the back end having a rear-facing back edge including a first protuberance near the top edge, a second protuberance near the bottom edge, a knob disposed between the first and second protuberances and rear-facing capture edges formed between the knob and each protuberance, the rear-facing capture edges configured to capture the first and second legs of a rear loop of a rope that is looped securely around the knob, and a rear aperture having a forward-facing engagement surface and an alignment aperture having a rear-facing engagement surface, the forward-facing engagement surface configured to engage the beginning of one leg of a rear loop of a rope that is passed through the rear aperture and fastened around the knob, the rear-facing engagement surface configured to engage the end of a return leg of a forward loop of a rope received in the alignment aperture, and the mouth, the knob, the forward-facing engagement surface and the rear-facing engagement surface configured to be in a substantially linear arrangement.

11. The rope tensioning and fastening device of claim 10, wherein:

each of the opposing surfaces of the mouth include a plurality of gripping members formed thereon, the gripping members configured to engage a portion of rope disposed between the opposing surfaces for securing the rope in the mouth when the rope is under tension.

12. The rope tensioning and fastening device of claim 10, wherein:

the rear aperture is disposed between the knob and the cinching aperture, and the cinching aperture is disposed between the alignment aperture and the mouth.

13. The rope tensioning and fastening device of claim 10, further comprising:

an alignment aperture between the mouth and cinching aperture, the alignment aperture configured to receive an initial leg of a forward loop of a rope extending from the rear aperture.

14. A rope tensioning and fastening, device comprising:

a substantially flat, elongated body extending lengthwise from a front end to a back end and widthwise from a top edge to a bottom edge, the front end having a forward-opening V-shaped mouth including opposing surfaces, each of the opposing surfaces of the mouth having a plurality of gripping members formed thereon, the gripping members configured to engage a portion of rope disposed between the opposing surfaces for securing the rope in the mouth when the rope is under tension, the back end having a rear-facing back edge including a first protuberance near the top edge, a second protuberance near the bottom edge, a knob disposed between the first and second protuberances and rear-facing capture edges formed between the knob and each protuberance, the rear-facing capture edges configured to capture the first and second legs of a rear loop of a rope that is looped securely around the knob, a rear aperture having a forward-facing engagement surface configured to engage the beginning of one leg of a rear loop of a rope that is passed through the rear aperture and looped securely around the knob, a cinching aperture having a rear-facing engagement surface configured to engage the end of a return leg of a forward loop of a rope extending from the rear aperture, the cinching aperture including a channel originating at an opening at the bottom edge and terminating at the rear-facing engagement surface, the rear-facing engagement surface disposed midway between the top and bottom edges, and an alignment aperture configured to receive an initial leg of a forward loop of a rope extending from the rear aperture, the alignment aperture including a channel originating at an opening at the top edge and terminating midway between the top and bottom edges, the rear aperture is between the knob and the cinching aperture, the cinching aperture disposed between the rear and alignment apertures, and the alignment aperture disposed between the cinching aperture and the mouth, and the mouth, the knob, the forward-facing engagement surface, the rear-facing engagement surface and the alignment aperture configured to be in a linear arrangement.

\* \* \* \* \*